(12) United States Patent
Amin

(10) Patent No.: US 6,574,516 B1
(45) Date of Patent: Jun. 3, 2003

(54) OPTIMIZER

(75) Inventor: Shara Jalal Amin, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/622,436

(22) PCT Filed: Mar. 6, 2000

(86) PCT No.: PCT/GB00/00788

§ 371 (c)(1),
(2), (4) Date: Aug. 17, 2000

(87) PCT Pub. No.: WO00/55759

PCT Pub. Date: Sep. 21, 2000

(30) Foreign Application Priority Data

Mar. 17, 1999 (GB) .............................................. 9906167
Jul. 2, 1999 (EP) ............................................ 99305270

(51) Int. Cl.[7] .............................................. G05B 13/02
(52) U.S. Cl. ............................ 700/28; 700/19; 700/29; 700/30; 700/46; 700/52; 700/53; 318/560; 318/561
(58) Field of Search ........................... 700/2–3, 19, 28, 700/29–30, 31, 32, 33, 39–40, 45–47, 52, 53; 318/560, 561

(56) References Cited

U.S. PATENT DOCUMENTS

| | | | | |
|---|---|---|---|---|
| 4,208,712 A | * | 6/1980 | Deutsch ........................ | 700/3 |
| 4,744,027 A | * | 5/1988 | Bayer et al. .................... | 705/7 |
| 4,894,773 A | * | 1/1990 | Lagarias ....................... | 705/7 |
| 5,136,538 A | * | 8/1992 | Karmarkar et al. ......... | 708/607 |
| 5,572,420 A | * | 11/1996 | Lu ............................... | 700/33 |
| 5,587,897 A | * | 12/1996 | Iida ............................. | 700/28 |
| 6,336,050 B1 | * | 1/2002 | Amin et al. .................. | 700/28 |

OTHER PUBLICATIONS

Hu et al, "Old Bachelor Acceptance: A New Class of Non–Monotone Threshold Accepting Methods", vol. 7, No. 4, 1995, pp. 417–425, XP 002121055.

Lin et al, "A Comparative Study of Both Standard and Adaptive Versions of Threshold Accepting and Simulated Annealing Algorithms in Three Scheduling Problems", European Journal of Operational Research, vol. 83, No. 2, Jul. 2–15, 1994, pp. 330–346, XP002120833.

Dueck, "New Optimization Heuristics—The Great Deluge Algorithm and the Record–to–Record Travel", Journal of Computational Physics, vol. 104, 1993, pp. 86–92, XP002120834.

Osman et al, "Capacitated Clustering Problems by Hybrid Simulated Annealing and Tabu Search", International Transactions in Operational Research, vol. 1, No. 3, 1994, pp. 317–337, XP002120835.

De Werra et al, "Tabu Search Techniques" or Spektrum, vol. 11, No. 3, Jan. 1, 1989, pp. 131–141, XP000471725.

* cited by examiner

Primary Examiner—Ramesh Patel
(74) Attorney, Agent, or Firm—Nixon & Vanderhye P.C.

(57) ABSTRACT

One or more signals are optimized in many industrial applications, one or more input quantities are combined according to a predetermined process to produce an output as a function of the inputs. For many types of functions, an optimum output value is possible, corresponding to a predetermined optimum input value or, where there is more than one input, to a set of such input values, which may be considered to define an input vector. A problem with many search techniques is that a local optimum rather than the global optimum is found. However, in the present optimization process, test values are selected, and the most optimal function values generated from the selected test values are stored. When a local optima is detected stored optimal function values are used to move away from the local optima.

4 Claims, 7 Drawing Sheets

OPTIMIZER

BACKGROUND OF THE INVENTION

1. Field of the Invention

This invention relates to an apparatus for, and a method of optimising one or more signals.

2. Related Art

In many industrial applications, one or more input quantities (for example quantities of raw materials or signal values) are combined according to some predetermined process to produce an output quantity (e.g. a chemical composition, or a processed signal) as a function of the inputs. In some cases, the function will be known, whereas in others it will not be known. In some cases, the function will linear, whereas in others it will be non linear. In some cases, the function will be continuous, whereas in others it will include discontinuities.

For many types of function, an optimum output value is possible, corresponding to a predetermined optimum input value or, where there is more than one input, to a set of such input values, which may be considered to define an input vector.

There will be a true optimum value (the global optimum value) but there are often local optima. It is generally desired to find the global optimum value, rather than local optima. Examples of functions which will have an optimum output value include functions for evaluating chemical yield, chemical composition, bit error rate of a process signal, or interference in a mobile telecommunications network.

For simple analytical functions, such as a cubic function, it is possible to find the optimum (in this case, for example, minimum) by differentiating the function, to locate points of inflection; double differentiating the function, to determine which are minima; determining the value of the function at each such minimum; and selecting the lowest. However, this approach fails where the function is either unknown or discontinuous, or both.

Two general numerical approaches which can deal with functions of these types are known, and will be referred to as "global" approaches and "local" approaches.

Global approaches include "brute force" search techniques; in such techniques, the function is evaluated at a large number of possible function values distributed over the range of possible input values, and the minimum is found directly.

Such an approach is possible for functions which depend on a small number of input variables, over a small range of those variables. However, for a large number of variables and/or a large variable range, the number of occasions on which the function must be solved (which is computationally intensive and time consuming) becomes very large, rendering such approaches slow and unsuitable for, for example, real time signal processing or network control applications.

On the other hand, "local" techniques start with one input vector position and "move" to a new vector position in a direction which optimises the function. For example, where the optimum sought is a minimum, the search process may consist of determining the function value at input values spaced at either side of the starting point, determining whether either generates a function value lower than the starting function value, and selecting that which does so; and then repeating the process.

It will be seen that a process of this kind will continue to move the currently selected input value until a local minimum of the function value is found. However, with local search techniques of this kind, there is no guarantee that the global optimum will be found.

A well known technique for avoiding convergence on local optima is the technique of simulated annealing, described for example in "Optimisation by simulated annealing" by S. Kirkpatrick et al, Science 220 (1983) pp 671–680. International paptent application number WO98/34188 describes another a local search technique which attempts to avoid local optima. Such techniques are referred to in this specification as energy minimisation techniques and the function to be solved is referred to as an energy function.

A problem with known techniques is that the performance is dependent on user selected parameters. For example, the performance of the simulated annealing algorithm is dependent on a parameter representing the 'initial temperature' and on the strategy selected for changing this parameter.

BRIEF SUMMARY OF THE INVENTION

In accordance with a first aspect of the present invention there is provided a method of finding preferred values for at least one input signal corresponding to an optimum of a function of the at least one input signal, the method comprising performing a plurality of cycles to reach a convergence defined by an exit criterion, each of which cycles comprises steps of (a) providing an old current value of the or each input signal;

(b) providing an old current value of the function;

(c) selecting a test value of one or more said input signals;

(d) generating said function from said selected test value or values and comparing the generated function value with the old current value of the function;

and either, when the outcome of step (d) is that the generated function value is more optimal than the old current value, the steps of (e) providing a new current value of the or each input signal equal to the selected test value or values, and a new current value of the function equal to the generated function value;

(f) testing whether that generated function value is more optimal than the most optimal of generated function values stored by previously performed cycles, and, if so, storing that generated function value;

(g) testing for said exit criterion, and if the exit criterion is not met, returning to step (a);

or, when the outcome of step (d) is that the generated function value is not more optimal than the old current value, the steps of (h) returning directly to step (a), provided that step (d) has not been followed by step (h) a predetermined number of times in succession; and otherwise (i) providing a new current value of the function equal to a generated function value stored under substep (f) of a previously performed cycle, and then returning to step (a).

Preferably, the operation of step (i) provides the new current value of the function equal to the most optimal stored generated function value, provided that the last succeeding operation of step (f) of a previous performed cycle did not store the respective generated function value; and wherein, if the last succeeding operation of step (f) of a previous performed cycle did store the respective generated function value, the nth operation of step (i), without any intervening operation of substep (e) when n in greater than one, provides the new current value of the function equal to the n+1th most optimal stored generated function value.

In accordance with a second aspect of the present invention there is provided an apparatus for finding preferred values for at least one input signal corresponding to an optimum of a function of the at least one input signal, the method comprising performing a plurality of cycles to reach a convergence defined by an exit criterion, the apparatus comprising:

means for detecting said exit criterion;

means for selecting a test value for at least one input signal;

means connected to receive the selected test value or values, and responsive to data defining said function of the at least one input signal to generate a function value from the selected test value or values;

a store for storing a current value of the function, a current value of the or each input signal, and one or more generated function values;

modifying means arranged
to receive the generated function value,
to modify the stored current value of the function to be equal to one of the function values when the current value has not been modified for a predetermined number of cycles of operation; and means for cyclically operating said selecting, generating and modifying means until the detecting means detects said exit criterion.

Preferably, the modifying means is arranged such that said one of the function values is the most optimal stored generated function value, provided that the last succeeding operation of the modifying means which found the received generated function value to be more optimal than the stored current value of the function also found that the received generated function value was not more optimal than the most optimal stored function value; and is also arranged such that said one of the function values is the n+1th most optimal stored generated function value, where n is the number of times, since the last succeeding operation of the modifying means which found the received generated function value to be more optimal than the stored current value of the function also found that the received generated function value was more optimal than the most optimal stored function value, that the modifying means modifies the stored current value of the function to be equal to one of the function values when the current value has not been modified for a predetermined number of cycles of operation.

In the present invention one or more signals are optimised using a technique which does not require user selected parameters.

A specific embodiment an optimiser of the present invention, and its method of operation will now be described by way of example only, with reference to the accompanying drawings in which.

Figure 1:
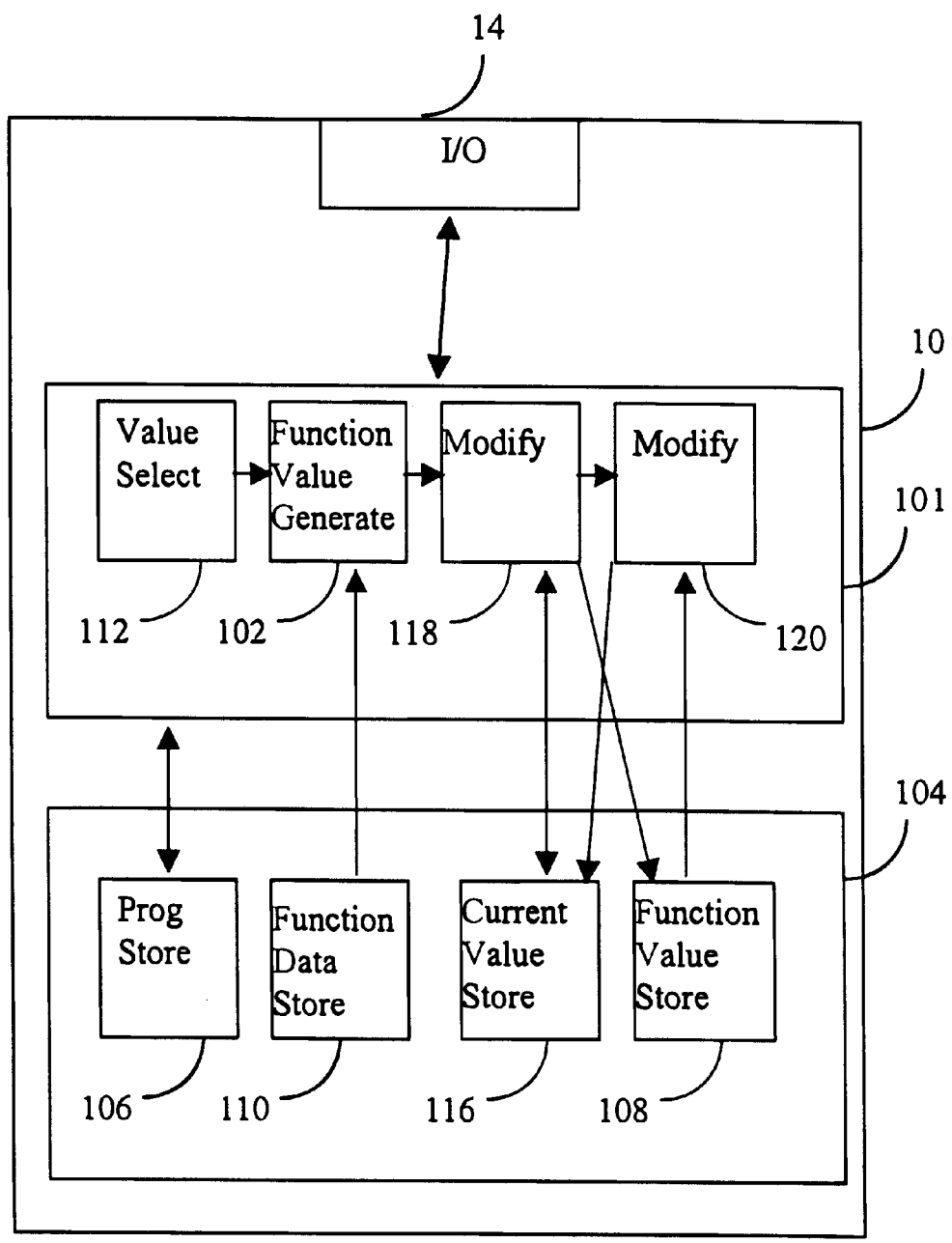
FIG. 1 is a block diagram of an optimiser.

Referring to FIG. 1, an optimiser 10 comprises a processor 102 (for example an Intel™ Pentium™ microprocessor or a reduced instruction set (RISC) microprocessor), arranged for communication with a memory 104 comprising a program memory 106 (which may, for example, be a read only memory); a function value store 108 (which may, for example, be random access memory) which stores data corresponding to function values generated by the function value generating means 102; a function data memory 110; and a current value store 116. The function data memory 110 stores data relating to the function to be optimised and may be read only memory (ROM) where the optimiser is desired to solve only a single function, but is more normally random access memory (RAM) to permit the input of a new function. The current value store 116 stores data representing a current value (and may, for example be random access memory). All three memories 106, 110, 108, 116 are simply be partitioned areas within a common memory device 104, in the optimiser shown.

The optimiser comprises means 112 to select signal values; means 102 to receive selected signal values and to generate a function value therefrom, using data from the function data store 110; first modifying means 118 arranged in operation to modify data in the current value store in dependence on a received generated function value; and second modifying means 120 arranged in operation to modify data in the current value store according to data retrieved from the function value store 108. The detailed operation of the optimiser will be described later with reference to FIG. 3.

In the optimiser shown the means 112, 102, 110 and 118 are provided by the processor 102 which operates in accordance with a program stored in the program memory 106.

Finally, an input/output interface device 114 is provided, at which data partly or completely defining a function to be optimised is received and supplied to the processor 102 and thence to the function data memory 110; and at which the processor 102 makes available the input values and/or the optimal function value.

Conveniently, the optimiser 10 may be provided as a suitably programmed personal computer or workstation, such as a Sun SparcStation™.

The operation of the optimiser 10 will now be described with reference to the flowchart of FIGS. 2 and 3, and the illustrated function shown in FIG. 4.

Figure 2:
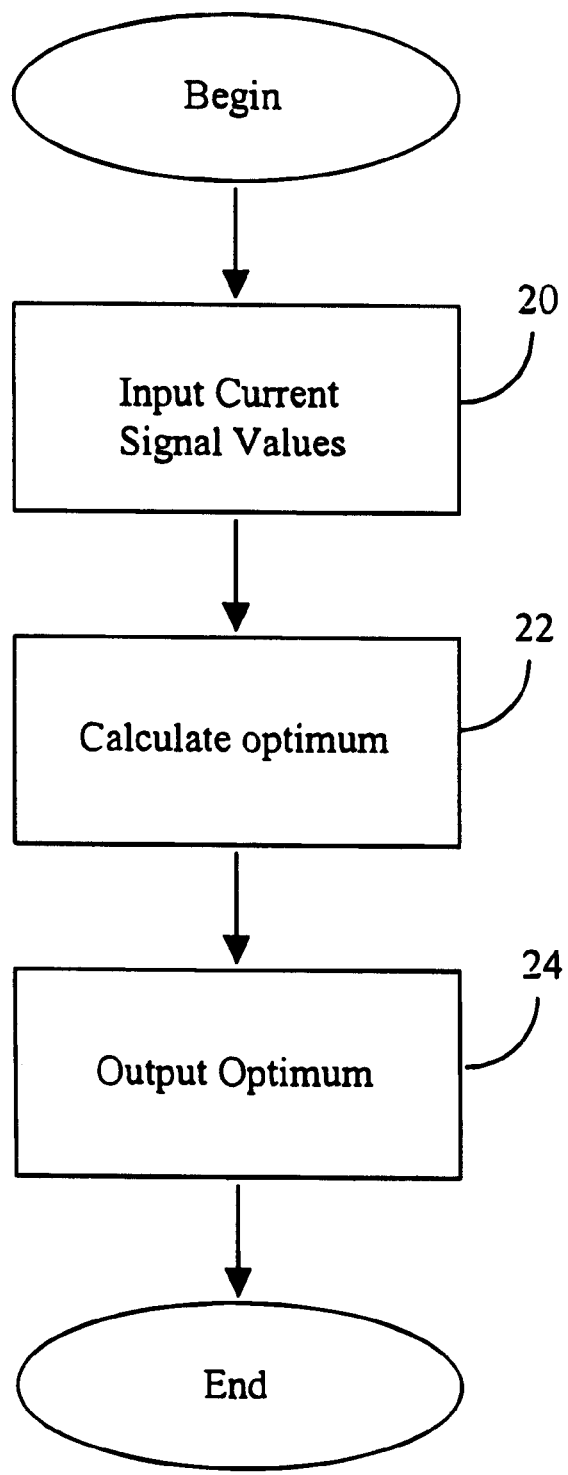
FIG. 2 is a flow diagram showing the overall operation of the optimiser of FIG. 1.

Referring to FIG. 2, in step 20 the processor 102 receives via the input/output interface 114, input data defining the function to be optimised, and stores this data in the function memory 110. In this embodiment the input data defining the function to be optimised is stored in data files which are read via the input/output interface 114. Function data could equally well be typed in via the input/output interface.

In step 22, the optimiser 10 calculates an optimum value for each input value, and in step 24 the processor 102 outputs the optimum values at the I/O interface 114.

Figure 3:
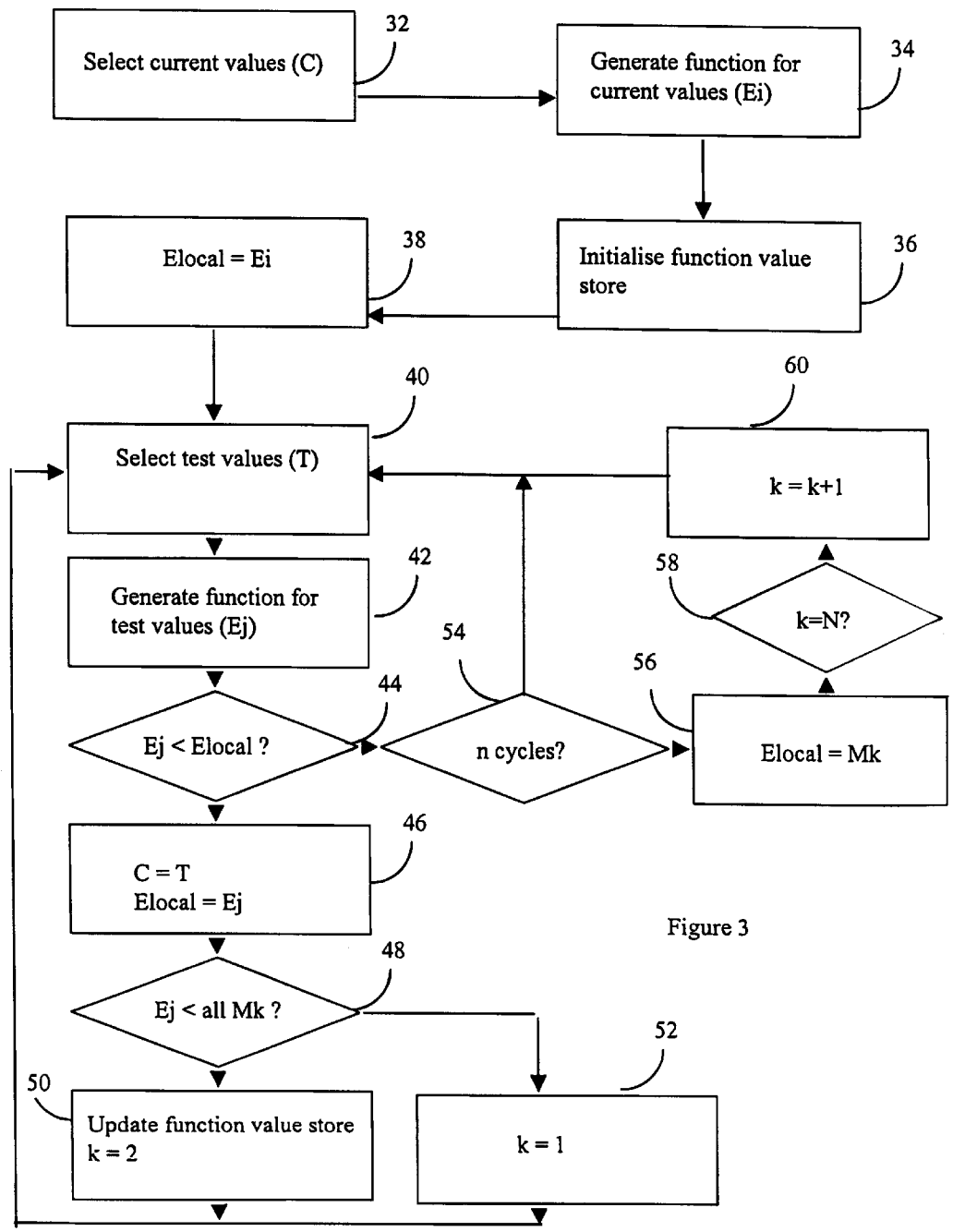
FIG. 3 is a flow diagram showing in greater detail part of the operation of FIG. 2.

Referring now to FIG. 3, the process performed in step 22 will now be described in greater detail.

In step 32 a current value for each of the input signal is selected, so as to collectively comprise an input vector. In this embodiment of the invention, the current values are chosen to satisfy a particular constraint. The method used to select current values in this embodiment of the invention will be described later with reference to FIGS. 6 and 7. However, the current value of input signals may be selected using any convenient method for example, they may be randomly chosen or may be chosen as the midpoint of each signal range.

In step 34 the value of the function for the current values is generated by the function value generating means 102. In step 36 the function value store 108 is initialised. In this embodiment of the invention the function value store is implemented as a sequential set of storage locations, conveniently referred to as $M_1 \ldots M_N$. Initially the value of the function for the selected current values is stored in each one of the storage locations $M_1$ to $M_N$. In step 38 the value of the function for the current value is recorded by storing it in the current value store 116 referred to as Elocal in the flow chart of FIG. 3. In step 40 a test value for each of the input signal is selected by the value selecting means 112 as will be described later with reference to FIGS. 6 and 7.

In step 42 the value of the function for the selected test values is generated by the function value generating means 102 and at step 44 the generated value is compared with the function value stored in Elocal. In this embodiment of the invention a smaller function value is more optimal. If the generated function value is less that the function value stored in Elocal then the selected test values are modified by setting them equal to the test values, and Elocal is modified by the modifying means 118 by storing the generated function value in Elocal at step 46. If the generated function value is less than all of the stored function values in $M_1 \ldots M_N$, determined at step 48, then the generated function value is stored in the function value store 108. In this embodiment of the invention the function value store is arranged so that any stored function values are stored in order of increasing magnitude, so $M_q < M_{q+1}$ for all q=1 to q=N−1. Therefore when a new function value is stored in the function value store at step 50, in this embodiment it will always be stored in the first location of the function value store i.e. $M_1$. If the generated function value is stored in the function value store at step 50 then a variable denoted in this description as k is also set to be equal to two at step 50, otherwise the variable k is set to be equal to one at step 52. The variable k is used as a flag to indicate whether the function value stored at Elocal is also stored in the function value store. When k=1 the function value stored at Elocal is not stored in the function value store 108, when k<>1 the function value stored at Elocal is stored in the function value store 108. The reason for setting k equal to one or two in dependence on whether the function value stored at Elocal is additionally stored in the function value store will become apparent later. The variable k is stored in a location (not shown) in the memory 104.

If at step 44 it is determined that the generated function value is greater than the value stored in Elocal then if a predetermined number of cycles have not yet been carried out (step 54) new test values are selected at step 40. However, if a predetermined number of cycles have already been carried out at step 54, then Elocal is modified at step 56 by the second modifying means 120 by setting it equal to one of the stored function values. It can be seen that if the current value of Elocal was stored in the function value store at step 50, then Elocal will contain the same function value as $M_1$. As k in this case would also have been set equal to two at step 50 Elocal is now modified at step 56 by setting it equal to $M_2$. However, if the current Elocal was not stored in the function value store at step 50 then Elocal does not contain the same function value as $M_1$. In this case k would have been set equal to one at step 52, and Elocal is modified at step 56 by setting it equal to $M_1$. Hence, the variable k is conveniently used to determine the stored function value to be used by the modifying means 120. Then the cycle of steps 40, 42, 44 and 54 is repeated using the modified value of Elocal stored in the current value store 116. Again, if after a predetermined number (n) of cycles the current values have not been modified Elocal is modified at step 56 by the modifying means 120 by setting it equal to the next most optimum function value in the function value store as determined by the variable k.

Criteria are defined for deciding when optimal signal values have been obtained. In this embodiment of the invention, each time that a new lower function value is stored in Elocal at step 46, the difference between the previous stored value and the new stored value is calculated (not shown in FIG. 3). If the difference remains extremely small for a predetermined number of cycles then optimal signal values have been obtained. In variants optimal signal values may be obtained when the function value of current signal values improves upon the function value of initially selected signal values by a predetermined amount. Another option is to define a predetermined number of cycles to be executed.

An example of this embodiment of the invention applied to a simple function will now be described with reference to FIG. 4 and also with reference to FIG. 3.

In this example a function value store of size eight is used. At step 32 initial current values are selected resulting in a function value of E1 at step 34. The function value store is initialised at step 36 as $$M = E1, E1, E1, E1, E1, E1, E1, E1$$

The function value of the initial values is stored in Elocal at step 36 so Elocal=E1.

At step 40 test values are selected, resulting in a function. value of a at step 42. The function value of a may have been obtained after several cycles of steps 40, 42 and 44 as long as the number of cycles was less than the predetermined number (n) at step 54.

At step 44 a is compared to E1 and is found to be less than E1, so Elocal is modified to be equal to a, and the current values are updated to be equal to the test values.

a is less than all of the stored function values so the function value store is updated at step 50 so $$M = a, E1, E1, E1, E1, E1, E1, E1$$

New test values are then selected at step 40, resulting in a function value of b at step 42. b is less than a so again the current values are updated. Again b is less than all of the stored function values so the function value store is updated at step 50 so $$M = b, a, E1, E1, E1, E1, E1, E1$$

New test values are then selected again at step 40, resulting in a function value of E2 at step 42. E2 is less than b so again the current values are updated. Again E2 is less than all of the stored function values so the function value store is updated at step 50 so $$M = E2, b, a, E1, E1, E1, E1, E1$$

However, after selecting test values n times at step 40 a function value of less than E2 is not obtained. Therefore Elocal is modified at step 56 to be equal to one of the stored function values. In this case k=2 because E2 is already stored in the function values store, so Elocal is set equal to $M_2$, in this case b. The steps 40, 42, 44 are then repeated until a function value of c is obtained. c is less than b so the current values are updated by setting them equal to the test values and Elocal is modified by setting it equal to c. However c is not less then all of the stored function values so the function value store is not updated.

New test values are then selected again at step 40, resulting in a function value of d at step 42. d is less than c so again the current values are updated. d is less than all of the stored function values so the function value store is updated at step 50 so $$M=d, E2, b, a, E1, E1, E1, E1$$

New test values are then selected again at step 40, resulting in a function value of E3 at step 42. E3 is less than d so again the current values are updated. E3 is less than all of the stored function values so the function value store is updated at step 50 so $$M=E3, d, E2, b, a, E1, E1, E1$$

However, after selecting test values n times at step 40 a function value of less than E3 is not obtained. Therefore Elocal is modified at step 56 to be equal to one of the stored function values. In this case k=2 because E3 is already stored in the function values store, so Elocal is set equal to $M_2$, in this case d. Again, after selecting test values n times at step 40 a function value of less than d is not obtained, so Elocal is modified at step 56 to be equal to the next largest stored function value $M_3$ in this case E2. Again, after selecting test values n times at step 40 a function value of less than E2 is not obtained, so Elocal is modified at step 56 to be equal to the next stored function value $M_4$, in this case b. The steps 40, 42, 44 are then repeated until a function value of e is obtained. e is less than b so the current values are updated by setting them equal to the test values for e and Elocal is modified by setting it equal to e. However, e is not less than all of the stored function values so the function value store is not updated.

New test values are then selected again at step 40, resulting in a function value of f at step 42. f is less than e so again the current values are updated. f is not less than all of the stored function values so the function value store is not updated.

However, after selecting test values n times at step 40 a function value of less than f is not obtained. Therefore Elocal is modified at step 56 to be equal to one of the stored function values. In this case k=1 because f is not stored in the function values store, so Elocal is set equal to $M_1$, in this case E3. Again, after selecting test values n times at step 40 a function value of less than E3 is not obtained, so Elocal is modified at step 56 to be equal to the next stored function value $M_2$, in this case d. Again, after selecting test values n times at step 40 a function value of less than d is not obtained, so Elocal is modified at step 56 to be equal to the next stored function value $M_3$, in this case E2. Again, after selecting test values n times at step 40 a function value of less than E2 is not obtained, so Elocal is modified at step 56 to be equal to the next stored function value $M_4$ in this case b. Again, after selecting test values n times at step 40 a function value of less than b is not obtained, so Elocal is modified at step 56 to be equal to the next stored function value $M_5$, in this case a. The steps 40, 42, 44 are then repeated until a function value of g is obtained. g is less than a so the current values are modified by setting them equal to the test values and Elocal is modified by setting it equal to g. However, g is not less than all of the stored function values so the function value store is not updated, bat at step 52 k is reset to be equal to one.

New test values are then selected again at step 40, resulting in a function value of h at step 42. h is less than g so again the current values are updated. h is not less than all of the stored function values so the function value store is not updated.

New test values are then selected again at step 40, resulting in a function value of o at step 42. o is less than h so again the current values are modified. o is not less than all of the stored function values so the function value store is not updated.

New test values are then selected again at step 40, resulting in a function value of p at step 42. p is less than o so again the current values are modified. p is less than all of the stored function values so the function value store is updated at step 50 so $$M=p, E3, d, E2, b, a, E1, E1$$

New test values are then selected again at step 40, resulting in a function value of E4 at step 42. E4 is less than p so again the current values are modified. E4 is less than all of the stored function values so the function value store is updated at step 50 so $$M=E4, p, E3, d, E2, b, a, E1, E1$$

However, after selecting test values n times at step 40 a function value of less than E4 is not obtained. Therefore Elocal is modified at step 56 to be equal to one of the stored function values. In this case k=2 because E4 is already stored in the function values store, so Elocal is set equal to $M_2$, in this case p. Again, after selecting test values n times at step 40 a function value of less than p is not obtained, so Elocal is modified at step 56 to be equal to the next stored function value $M_3$, in this case E3. Again, after selecting test values n times at step 40 a function value of less than E3 is not obtained, so Elocal is modified at step 56 to be equal to the next stored function value $M_4$, in this case d. Again, after selecting test values n times at step 40 a function value of less than d is not obtained, so Elocal is modified at step 56 to be equal to the next stored function value $M_5$, in this case E2. The steps 40, 42, 44 are then repeated until a function value of q is obtained. q is less than E2 so the current values are modified by setting them equal to the test values and Elocal is modified by setting it equal to q. However, q is not less than all of the stored function values so the function value store is not updated.

Figure 4:
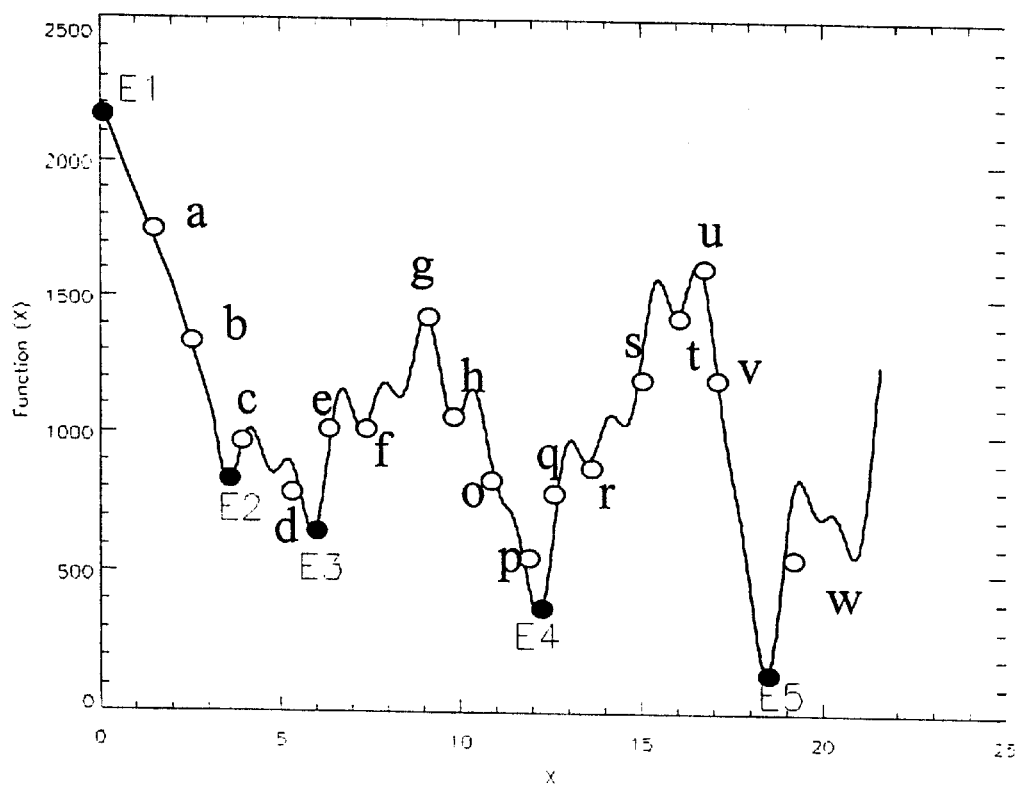
FIG. 4 is an example of a function used to illustrate the operation of the optimiser according to flow diagrams of FIGS. 2 and 3.

These cycles are repeated, for example as shown for the remaining function value in FIG. 4 until the defined criteria for accepting a preferred set of signal values is met.

An embodiment of this invention will now be described for application to frequency planning in cellular telephone networks.

A cellular telephone network consists of a number of fixed base station transceivers and a much larger number of mobile units which communicate with base stations via a radio channel. The number of radio channels which the operator is permitted to use is limited, and there are not enough for each phone call in the network to be carried on a different channel. Each base station has allocated to it a number of radio channels which it can use to communicate with the mobile units. Typically each channel comprises separate frequencies for the uplink (mobile-to-base station transmission) and the downlink (base-station-to-mobile). In a typical system each uplink frequency is associated with a predetermined downlink frequency, although the different channels may be frequencies, time slots within a frequency, or some other division of the spectrum.

Each mobile unit requires a separate channel to be assigned in order to communicate with a base station. A channel is assigned to the link between the mobile unit and the base station when communication is to be set up, the channel being selected from those allocated for use by the base station and available for setting up a link (i.e. not currently assigned to a link.)

A central principle of such networks is channel re-use (Lee, W. C. Y. : *Mobile Cellular Telecommunications Systems.* McGraw-Hill Book Company, New York, 1989): at any time many base stations may be transceiving on a particular channel. This introduces the possibility of interference between phone calls. Interference from other calls using the same channel is known as 'co-channel interference'. 'Adjacent channel' interference, due to another call using a different channel, is also a problem: a call made on a channel corresponding to a frequency band of 4000–4025 kHz is liable to interference from a call on the adjacent band; 4025–4050 kHz. Adjacent channel interference can occur between two calls in the same cell, as well as between adjacent cells.

The 'cells' from which these cellular telephone networks get their name are the coverage areas of the individual fixed radio base stations. The problem facing the network operator is to allocate channels to base stations such that demand for channels across the network is met, while keeping interference within acceptable levels. These aims are clearly in conflict: the more channels allocated to each base station the harder it is to plan the channel re-use to avoid unacceptable interference.

Considerable research has gone into optimising re-use patterns of these channels, to determine how close together two cells using the same channels can be without causing significant co-channel interference, thereby allowing the most efficient use of the spectrum.

Figure 5:
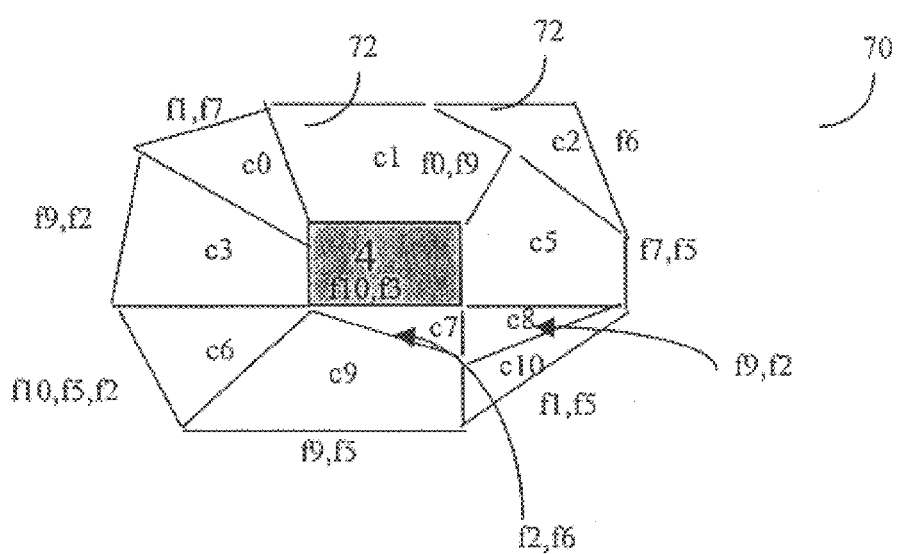
FIG. 5 shows a simplified cellular network.

A function to be optimised and a technique for selecting test values (step 40) and for generating the function for selected test values (step 42) will now be described for an embodiment of the invention for assigning channels in a cellular network. Referring now to FIG. 5 which shows a simplified cellular network 70 in which there are eleven cells 72, and there are eleven channels to select from, labelled f0 to f10. In a practical system there would usually be over one thousand cells and around forty channels to select from.

For each cell it is determined which other cells are responsible for co-channel interference and which ones are responsible for adjacent channel interference and a penalty is determined for each cell which causes interference, depending on the amount of interference caused. In the cellular network shown in FIG. 5, for example, cells numbered c0,c1,c3,c5,c6,c7,c8,c9,c10 might be responsible for co-channel interference in cell 4, and cells c0,c1,c3,c5,c7,c8 might be responsible for adjacent channel interference in cell c4. In general for a given cell, the cells responsible for adjacent channel interference will be a subset of the cells responsible for co-channel interference.

The magnitude of each interference penalty is determined by measurements made in the actual cellular network.

The total interference may then be determined by calculating:

$$\frac{1}{2}\sum_{i=1}^{N}\left(\sum_{j=1}^{N}P_{i,j}^{c}+\sum_{j=1}^{N}P_{i,j}^{a}\right) \quad (1)$$

Where N is the number of cells, $P_{i,j}^{c}$ is the co-channel interference penalty between cell cl and cell cj, $P_{i,j}^{a}$ is the adjacent channel interference penalty between cell cl and cell cj. If cell cl and cell cj do not cause each other interference then the relevant interference penalty will be 0.

The total is divided by two, as each interference penalty is enumerated twice, once when considering one cell in a pair of cells which cause interference to each other, and once when considering the other cell of such a pair. In this example cellular system it is assumed that any interference is symmetric i.e. $P_{i,j}^{c}=P_{j,i}^{c}$ and $P_{i,j}^{a}=P_{j,i}^{a}$.

It is required to minimise the above function for a given demand for a number of channels in each cell. If demand is low and there are enough channels available then it is possible to obtain an interference of 0. In FIG. 5 the given demand is two channels for each of cells c0, c1, c3, c4, c5, c7, c8, c9, c10, one channel for cell c2, and three channels for cell c6.

An initial assignment of channels to cells is made (corresponding to step 32 of FIG. 3) which satisfies a given demand, and does not assign the same channel to the same cell more than once. The initial assignment is made in such a way as to attempt to minimise interference in a heuristic manner. For example adjacent channels are not assigned to the same cell unless necessary to satisfy the demand. In FIG. 5 c1 has been assigned channels f0 and f9, cell c2 has been assigned channel f6, cell c3 has been assigned channels f9 and f2 and so on.

The initial interference is calculated according to equation 1. A test assignment is then made (corresponding to step 40 of FIG. 3). In this embodiment of the invention there are two methods for selecting a test assignment of channels to cells. The first method is to select randomly two cells and then to select randomly a channel which has been assigned to each of the selected cells. The randomly selected channel from the first cell is then assigned to the second cell and vice versa, as long as such a reassignment does not result in either cell having the same channel assigned to it more than once. An example of this first method will be described later with reference to FIGS. 6a and 6b.

The second method used is to select one cell at random and then select randomly a channel which has been assigned to that cell. The randomly selected channel is replaced by another channel which is different from all the channels currently assigned to that cell. If possible, the replacement channel is selected so that it does not cause any adjacent channel interference to channels in the selected cell. An example of the second method of test assignment selection will be described later with reference to FIG. 7a and 7b.

The interference must then be calculated for the test assignment of channels to cells. It will be appreciated that in a practical system with more than one thousand cells and around forty channels the enumeration of Equation 1 will be quite time consuming. In this embodiment of the invention the change in the total interference is determined as follows.

Figure 6A:
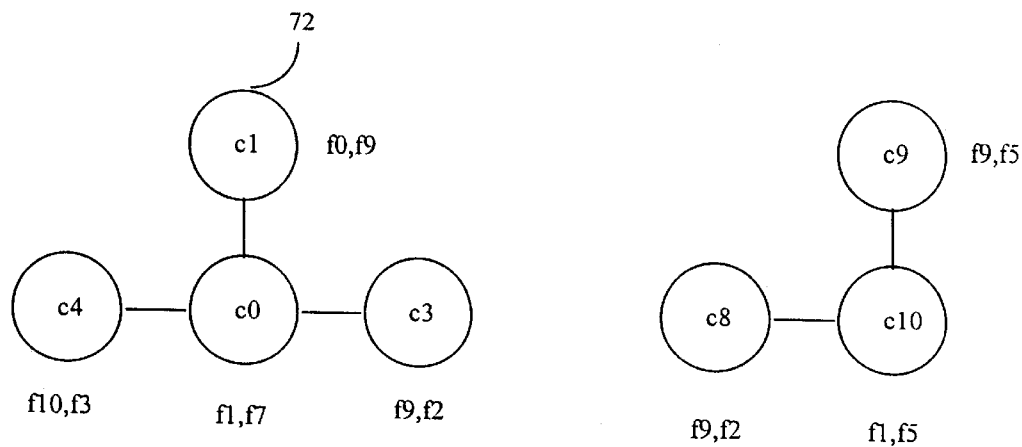
FIGS. 6a and 6b shows diagrammatically sources of interference between channels for two cells selected from the network shown in FIG. 5 before and after a frequency allocation change.
Figure 6B:
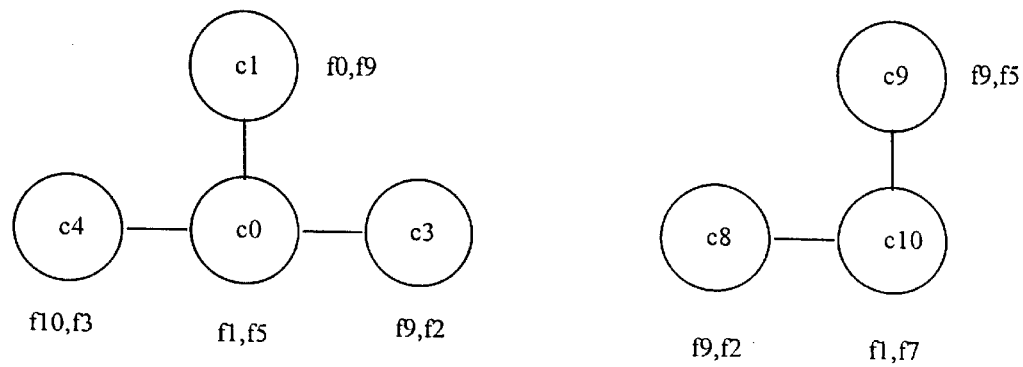

Referring again to FIG. 5 and additionally to FIGS. 6a and 6b in which each cell 72 is represented by a circle. FIG. 5 shows the initial assignment of channels to cells. The interference, $E_1$, due to the initial channel assignment shown is calculated at step 34. Cell c0 and cell c10 are selected randomly to create a test assignment according to the first method. Cell c0 may interfere with cells c4, c1 and c3 and cell c10 may interfere with cells c8 and c9 as shown in FIG. 6a. Channels are numbered such that channel f1 will cause adjacent channel interference to channel f0 and channel f2. Channel f2 will cause adjacent channel interference to channel f1 and channel f3 and so on.

The interference term, $\Delta E_1$, for cell 0 is $P_{0,3}{}^a+P_{0,1}{}^a$ due to adjacent channel interference between channel f1 in cell c0 and channel f2 in cell c3 and due to adjacent channel interference between channel f1 in cell c0 and channel f0 in cell c1. The interference term, $\Delta E_2$, for cell 10 is $P_{8,10}{}^a+P_{1,0,9}{}^c$ due to adjacent channel interference between f1 in cell 10 and f2 in cell 8 and co-channel interference between f5 in cell 10 and f5 in cell 9. Therefore the interference term for the selected cells is $$\Delta E=\Delta E_1+\Delta E_2=P_{0,3}{}^a+P_{0,1}{}^a+P_{8,10}{}^a+P_{10,9}{}^c$$

A channel is then selected from each of the selected cells c0 and c10 for reassignment to the other of the selected cells. In this case channel f7 is selected from cell c0 and channel f5 is selected from cell c10 as any other selection would result in a reassignment which makes no difference, or in a reassignment which involves a cell having the same channel assigned to it more than once. The reassigned channels are shown in FIG. 6b and the new interference term is $$\Delta E=\Delta E_1+\Delta E_2=P_{0,3}{}^a+P_{0,1}{}^a+P_{8,10}{}^a$$

as there is no longer any co-channels interference between cell c10 and cell c9. The difference between the initial function value $E_1$ and the new function value $E_j$ is $$\delta E=\Delta E-\Delta E=-P_{9,10}{}^c$$

and the new function value $$E_j=E_i+\delta E$$

Figure 7A:
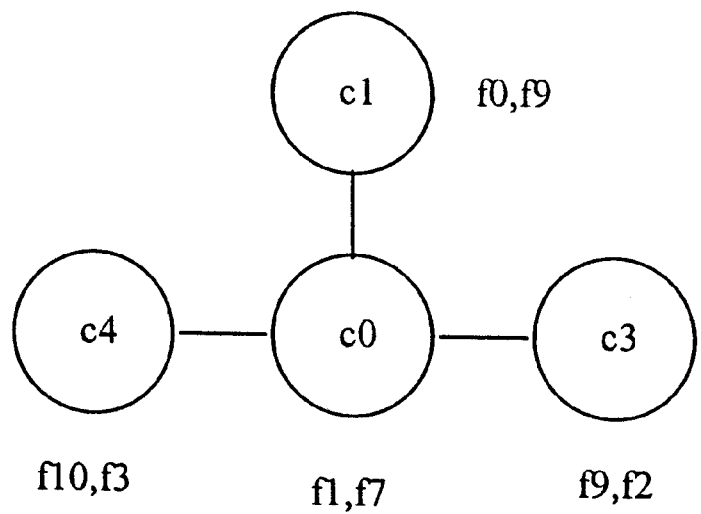
FIGS. 7a and 7b shows diagrammatically sources of interference between channels for a single cell selected from the network shown in FIG. 5, before and after a frequency allocation change.
Figure 7B:
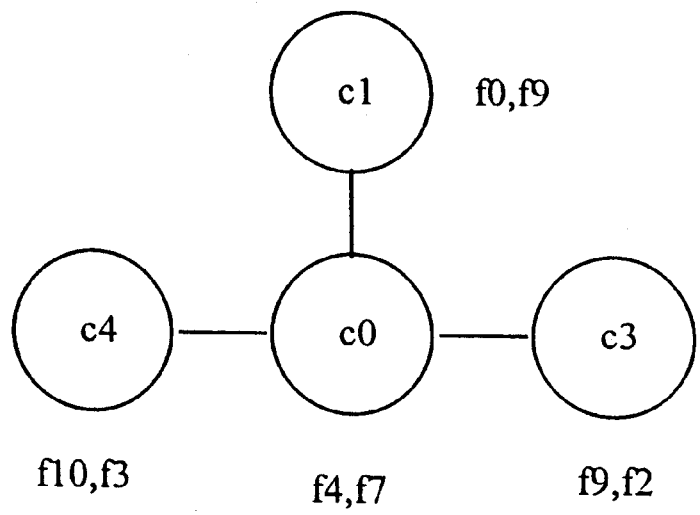

Referring now to FIGS. 7a and 7b and example of the second method of selecting a test assignment of channels to cells will be described. A cell is selected randomly for reassignment of one of its channels. In this example cell c0 is selected. Assuming the initial assignment of channels to cells shown in FIG. 5, then the interference term for cell c0 is $$\Delta E=P_{0,1}{}^a+P_{0,3}{}^a$$

A channel is selected at random for reassignment of a new channel for example f1. A new channel is selected for assignment to cell c0, preferably a channel which will not cause co-channel interference to any of the neighbouring cells, for example f4. The new interference term for cell c0 becomes $$\Delta E=P_{0,4}{}^a$$

and the difference between the initial function value $E_1$ and the new function value $E_j$ is $$\delta E=E-\Delta E=P_{0,4}{}^a-P_{0,1}{}^a-P_{0,3}{}^a$$

again the new function value $$E_j=E_i+\delta E$$

It will be appreciated that the change in the function value is likely to be greater when a test assignment is selected using the first method than when a test assignment is selected using the second method, therefore the second method is used twice as often as the first method. A variant of the second method is also used in which two cells are selected at random and a reallocation of one channel is made for each cell. The change in the function value is then calculated taking into account the change in function value for both cells in a similar manner to the calculation used in the first method.

What is claimed is:

1. A method of finding preferred values for at least one input signal corresponding to an optimum of a function of the at least one input signal, the method comprising performing a plurality of cycles to reach a convergence defined by an exit criterion, each of which cycles comprises:
   (a) providing an old current value of the or each input signal;
   (b) providing an old current value of the function;
   (c) selecting a test value of one or more said input signals;
   (d) generating said function from said selected test value or values and comparing the generated function value with the old current value of the function;
   and either, when the outcome of step (d) is that the generated function value is more optimal than the old current value, the steps of
   (e) providing a new current value of the or each input signal equal to the selected test value or values, and a new current value of the function equal to the generated function value;
   (f) testing whether that generated function value is more optimal than the most optimal of generated function values stored by previously performed cycles, and, if so, storing that generated function value;
   (g) testing for said exit criterion, and if the exit criterion is not met, returning to step (a);
   or, when the outcome of step (d) is that the generated function value is not more optimal than the old current value, the steps of
   (h) returning directly to step (a), provided that step (d) has not been followed by step (h) a predetermined number of times in succession; and otherwise
   (i) providing a new current value of the function equal to a generated function value stored under substep (f) of a previously performed cycle, and then returning to step (a).

2. A method as in claim 1 wherein the operation of step (i) provides the new current value of the function equal to the most optimal stored generated function value, provided that the last succeeding operation of step (f) of a previous performed cycle did not store the respective generated function value; and wherein, if the last succeeding operation of step (f) of a previous performed cycle did store the respective generated function value, the nth operation of step (i), without any intervening operation of substep (e) when n is greater than one, provides the new current value of the function equal to the n+1th most optimal stored generated function value.

3. An apparatus for finding preferred values for at least one input signal corresponding to an optimum of a function of the at least one input signal, the method comprising performing a plurality of cycles to reach a convergence defined by an exit criterion, the apparatus comprising:
   means for detecting said exit criterion;
   means for selecting a test value for at least one input signal;
   means connected to receive the selected test value or values, and responsive to data defining said function of the at least one input signal to generate a function value from the selected test value or values;

a store for storing a current value of the function, a current value of the or each input signal, and one or more generated function values;

modifying means arranged
 to receive the generated function value,
 to modify the stored current value of the function to be equal to that received generated function value, and the stored current value of the or each input signal to be equal to the selected test value or values, when that received generated function value is more optimal than the stored current value of the function,
 to store the generated function value when that generated function value is more optimal than the most optimal stored function value, and
 to modify the stored current value of the function to be equal to one of the function values when the current value has not been modified for a predetermined number of cycles of operation; and means for cyclically operating said selecting, generating and modifying means until the detecting means detects said exit criterion.

4. An apparatus as in claim 3 wherein the modifying means is arranged such that:

said one of the function values is the most optimal stored generated function value, provided that the last succeeding operation of the modifying means which found the received generated function value to be more optimal than the stored current value of the function also found that that the received generated function value was not more optimal than the most optimal stored function value; and said one of the function values is the n+1th most optimal stored generated function value, where n is the number of times, since the last succeeding operation of the modifying means which found the received generated function value to be more optimal than the stored current value of the function also found that the received generated function value was more optimal than the most optimal stored function value, that the modifying means modifies the stored current value of the function to be equal to one of the function values when the current value has not been modified for a predetermined number of cycles of operation.

* * * * *